US009401608B2

United States Patent
Chapple

(10) Patent No.: US 9,401,608 B2
(45) Date of Patent: Jul. 26, 2016

(54) SYSTEM FOR VEHICLE JUMP STARTING

(71) Applicant: Charles Chapple, Loganville, GA (US)

(72) Inventor: Charles Chapple, Loganville, GA (US)

( * ) Notice: Subject to any disclaimer, the term of this patent is extended or adjusted under 35 U.S.C. 154(b) by 0 days.

(21) Appl. No.: 14/192,892

(22) Filed: Feb. 28, 2014

(65) Prior Publication Data
US 2015/0349553 A1    Dec. 3, 2015

Related U.S. Application Data

(60) Provisional application No. 61/851,038, filed on Feb. 28, 2013.

(51) Int. Cl.
| | | |
|---|---|---|
| *H02J 7/00* | (2006.01) | |
| *H01R 11/24* | (2006.01) | |
| *H01R 11/28* | (2006.01) | |
| *H01R 13/629* | (2006.01) | |

(52) U.S. Cl.
CPC .............. *H02J 7/0042* (2013.01); *H01R 11/24* (2013.01); *H01R 11/282* (2013.01); *H01R 13/62933* (2013.01)

(58) Field of Classification Search
CPC ............... G01R 31/3662; H01M 2/30; H01M 2200/00; H01M 2/305; H02J 2001/006; H02J 7/0034; H02J 7/0042; H02J 7/0054; H02J 1/06; H02J 2007/0062; H02J 7/0021; H02J 7/0031; H02J 7/007; H02J 7/0045
USPC .................................................. 320/102–110
See application file for complete search history.

(56) References Cited

U.S. PATENT DOCUMENTS

| | | |
|---|---|---|
| 4,079,304 A | 3/1978 | Brandenburg |
| 4,185,204 A | 1/1980 | Fima |
| 4,217,534 A | 8/1980 | Cole |
| 4,274,690 A | 6/1981 | Hargett et al. |
| 4,286,172 A | 8/1981 | Millonzi et al. |
| 4,449,089 A | 5/1984 | Winkler |
| 4,488,147 A | 12/1984 | Signorile |
| 4,489,223 A | 12/1984 | Puckett et al. |
| 4,667,141 A | 5/1987 | Steele |
| 4,700,961 A | 10/1987 | Thomas et al. |
| 4,807,895 A | 2/1989 | Thomas et al. |
| 4,897,044 A | 1/1990 | Rood |
| 4,932,896 A | 6/1990 | Julian |
| 5,013,259 A | 5/1991 | Maurer |
| 5,083,076 A | 1/1992 | Scott |
| 5,180,310 A | 1/1993 | Miller |
| 5,297,977 A | 3/1994 | Lamper |
| 5,367,243 A | 11/1994 | Wells et al. |
| 5,435,759 A | 7/1995 | Adams et al. |
| 5,597,331 A | 1/1997 | Gable et al. |
| 5,793,185 A | 8/1998 | Prelec et al. |
| 5,820,407 A | 10/1998 | Morse et al. |

(Continued)

*Primary Examiner* — Binh Tat
(74) *Attorney, Agent, or Firm* — F. Russell Denton; Denton Intellectual Property Law Firm, LLC

(57) ABSTRACT

The invention provides a system for jump starting vehicle batteries in which the service end of each of two jumper cables has a self-adjusting locking clamp, and each jumper cable is segmented into two parts that are joined by a plug and socket configured such that the cable parts cannot be incorrectly joined or will be relatively harmless if incorrectly joined. Auxiliary wiring is provided for recharging freestanding source batteries that are used for jump-starting. The system enhances user safety, simplifies making and breaking of electrical connections, and facilitates the use of back-up batteries.

20 Claims, 3 Drawing Sheets

(56) References Cited

U.S. PATENT DOCUMENTS

| | | |
|---|---|---|
| 5,985,481 A | 11/1999 | Champagne et al. |
| 6,679,708 B1 | 1/2004 | Depp et al. |
| 6,799,993 B2 | 10/2004 | Krieger et al. |
| 7,301,303 B1 * | 11/2007 | Hulden ............... H01M 2/1005 320/103 |
| 7,508,163 B2 | 3/2009 | Batts-Gowins |
| 7,795,838 B2 | 9/2010 | Singarajan et al. |
| 8,172,603 B1 * | 5/2012 | Richardet, Jr. ......... H01R 11/24 439/504 |
| 8,199,024 B2 | 6/2012 | Baxter et al. |
| 2003/0085621 A1 | 5/2003 | Potega |
| 2005/0070155 A1 | 3/2005 | Horenstein |
| 2012/0286720 A1 * | 11/2012 | Fassnacht ............ B60L 3/0046 320/105 |

\* cited by examiner

SYSTEM FOR VEHICLE JUMP STARTING

PRIOR APPLICATIONS

This application claims priority from a U.S. provisional patent application Ser. No. 61/851,038, filed Feb. 28, 2013 by the same sole inventor, entitled "System for Automotive Jump Starting".

BACKGROUND

Existing automotive jumper cable systems suffer from some deficiencies that affect the convenience and safety of their use. Especially for automotive service professionals this is a regular for three reasons. First, electrical connections need to be made quickly yet reliably for both mechanical grip and correct polarity when applying cable clamps to vehicle battery electrode posts. Also, the presence and hazards inherent in sparks and electrical arcing must be minimized; these are common when making and breaking electrical connections, and pose a risk both for human safety and due to the flammability of fumes and oily deposits that are common in engine compartments. In addition, most cable systems require users to position two vehicles in close proximity in order to re-charge the battery of one from the battery of the other, whereas this is not always possible or safe when the first vehicle has stalled on a busy highway, moreover a charge-providing vehicle may need placement at an awkward position for charging purposes.

In light of these and other difficulties, various features have been developed by others. For instance, to ensure proper polarity indicator lights and alarms have been introduced in various configurations to show a closed circuit. See, e.g., U.S. Pat. Nos. 4,217,534; 4,185,204; 4,488,147; 4,897,044; 5,180,310; 5,083,076; and 5,367,243. In addition, U.S. Pat. No. 4,449,089 provides a circuit that automatically switches from charging an internal battery to charging an external battery when the connection is correct, and that reverts to internal charging when the external battery is disconnected. U.S. Pat. No. 5,793,185 provides a hand-held charger unit that includes an internal battery, charger circuit that can accept AC or DC electrical sources, connections and controls to prevent overcharging and incorrect polarity. U.S. Pat. No. 5,820,407 teaches the use of half-wave rectifier-biased directional jumper cables for placing a discharged battery in parallel with a charged battery to increase the electrical energy available for charging. U.S. Pat. No. 6,799,993 provides a portable energy source in which a battery compartment has an opening, a cover, and a power inverter that is mechanically connected to the cover and when the cover is closed is electrically connected to the battery. U.S. Pat. No. 8,199,024 discloses a circuit that assesses polarity and whether it is safe to connect two low-voltage systems, and that if it is safe to do so then provides a "soft start" connection in order to minimize voltage spikes. U.S. Pat. App. Pub. No. 2005/0070155 teaches the use of jumper cable sections connected by hermaphroditic connectors at each end to ensure proper polarity and safe connections, and also includes a fusible component as a safety feature.

Matching voltages and/or amplitudes has also been addressed by various means. U.S. Pat. No. 6,679,708 teaches use of a junction box that prevents flow of high current during jump-starting and that has a convenient blade for attaching a jumper cable's positive lead. U.S. Pat. No. 7,508,163 teaches use of a rechargeable AC 110V portable power supply that can be used to jump start a dead vehicle battery either by a trickle charge or via the vehicle's lighter outlet. U.S. Pat. No. 7,795,838 provides a visual display of battery data and state of charge data for charging a high voltage battery in a hybrid vehicle. U.S. Pat. App. Pub. No. 2003/0085621 employs a power supply that detects device power requirements and adapts to provide it. Connections that isolate a device and its dead battery allow the power supply to recharge the battery in parallel with powering the device.

Among other strategies that have been employed, switch configurations have been introduced to reduce or eliminate sparking. U.S. Pat. No. 4,286,172 describes use of a relay at intermediate segments of jumper cables. The relay keeps the circuit open unless actuated by a solenoid that is in series with a push button switch and a relatively strong battery to which the cables are connectable. U.S. Pat. No. 4,489,223 employs a radio signal-actuated solenoid circuit to enable power transfer from the battery of a service vehicle to the battery of a second vehicle. U.S. Pat. No. 5,297,977 discloses uses of two paired sets of jumper cables that share a junction box and a manual switch for electrical flow.

In several cases workers have attempted to simply relocate any potential for sparking to a convenient location that is remote from the engine and battery. U.S. Pat. No. 4,274,690 discloses electrical connection of a vehicle battery to apertures in the vehicle's body panels, through which the battery may be jump started. U.S. Pat. Nos. 4,700,961 and 4,807,895 teach the use of electrical terminals in a cover-protected exterior compartment of a vehicle, to facilitate charging the vehicle's battery and quick starts without sparking near the battery. U.S. Pat. No. 5,013,259 describes an auxiliary unit designed for remote mounting from a battery to which it is connected, to facilitate connection with a jumper cable.

Various other innovations have been introduced to improve the convenience of jump starting. U.S. Pat. No. 4,079,304 describes the use of paired jumper cables on a reel. U.S. Pat. No. 4,667,141 discloses a jumper battery on a hand truck; discharge for use in jump started is actuated by a switching circuit that responds to a token or coin. U.S. Pat. No. 4,932,896 provides a jumper cable extension format having terminal through-holes at each end. U.S. Pat. No. 5,435,759 teaches a jumper cable clamp in which the jaw has—in addition to teeth—opposing half-round features such as for gripping a cable or wire. U.S. Pat. No. 5,597,331 describes a charging cable that employs at one end a pinch bolt and fastener to secure a clamp to a battery terminal post on a first battery, and that employs at the other end a transfer terminal for removable connection to a stud on a second battery, such that the first battery is not easily disconnected or accidentally loosened unless the second battery is disconnected first. U.S. Pat. No. 5,985,481 discloses a reserve battery based on aluminum anodes and chalcogen cathodes, and for which hydroxide electrolyte crystals that are released into the cell's solvent when needed, where the reserve battery is configured to jump-start or bypass the main battery.

Although each of these prior designs has useful features, nevertheless automotive professionals continue to need designs that cost less, enhance safety, facilitate rapid application and charging, and do not require specialized designs for the vehicles that are being surfaced. Thus there is an ongoing need for improved jump-starting systems.

BRIEF SUMMARY OF THE INVENTION

The invention provides a system for jump starting vehicle batteries in which the service end of each of two jumper cables has a self-adjusting locking clamp, and each jumper cable is segmented into two parts that are joined by a plug and socket configured such that the cable parts cannot be incorrectly joined or will be relatively harmless if incorrectly joined. Auxiliary wiring is provided for recharging freestanding source batteries that are used for jump-starting. The system enhances user safety, simplifies making and breaking of electrical connections, and facilitates the use of back-up batteries.

In a particular embodiment the invention provides a system for jump starting vehicle batteries, wherein the system comprises:
  a) a first jumper cable having the following structure:
    i) the cable comprises a source end, a service end, and a reversible coupling that when in a joined state is located at an intermediate position between the two ends;
    ii) the source end comprises a lead portion for forming a mechanical and electrical connection with a first electrical terminal of a voltage source;
    iii) the service end is in electrical communication with a locking, self-adjusting clamp;
    iv) the reversible coupling comprises a plug and a socket that when joined form a mechanically snug union; and
    v) when the reversible coupling is not joined, the cable is separated into two independent sub-cables, wherein a first sub-cable comprises the source end and a plug end, and a second sub-cable comprises the service end and a socket end;
  b) a second jumper cable having the following structure:
    i) the cable comprises a source end, a service end, and a reversible coupling that when in a joined state is located at an intermediate position between the two ends;
    ii) the source end comprises a lead portion for forming a mechanical and electrical connection with a second electrical terminal of the voltage source;
    iii) the service end is in electrical communication with a locking, self-adjusting clamp;
    iv) the reversible coupling comprises a plug and a socket that when joined form a mechanically snug union; and
    v) when the reversible coupling is not joined, the cable is separated into two independent sub-cables, wherein a third sub-cable comprises the source end and a socket end, and a fourth sub-cable comprises the service end and a plug end; and
  c) a voltage source that is in electrical communication with a positive electrical lead and a negative electrical lead, wherein
    i) the positive electrical lead is further in electrical communication with the source end of the first or second jumper cable;
    ii) the negative electrical lead is in electrical communication with the source end of the other of the first or second jumper cable;
    iii) the positive electrical lead of the voltage source is further in electrical communication with a number M of auxiliary electrically conducting cables, wherein M is an integer that has a value selected from the group consisting of 0 and at least 1; and
    iv) the negative electrical lead of the voltage source is further in electrical communication with a number N of auxiliary electrically conducting cables, wherein N is an integer and has a value that is equal to the value of M.

In another embodiment the invention provides a system for jump starting vehicle batteries, wherein the system comprises:
  a) a first jumper cable having the following structure:
    i) the cable comprises a source end, a service end, and a reversible coupling that when in a joined state is located at an intermediate position between the two ends;
    ii) the source end comprises a lead portion for forming a mechanical and electrical connection with a first electrical terminal of a voltage source;
    iii) the service end is in electrical communication with a locking, self-adjusting clamp;
    iv) the reversible coupling comprises a plug and a socket that when joined form a mechanically snug union; and
    v) when the reversible coupling is not joined, the cable is separated into two independent sub-cables, wherein a first sub-cable comprises the source end and a plug end, and a second sub-cable comprises the service end and a socket end;
  b) a second jumper cable having the following structure:
    i) the cable comprises a source end, a service end, and a reversible coupling that when in a joined state is located at an intermediate position between the two ends;
    ii) the source end comprises a lead portion for forming a mechanical and electrical connection with a second electrical terminal of the voltage source;
    iii) the service end is in electrical communication with a locking, self-adjusting clamp;
    iv) the reversible coupling comprises a plug and a socket that when joined form a mechanically snug union; and
    v) when the reversible coupling is not joined, the cable is separated into two independent sub-cables, wherein a third sub-cable comprises the source end and a socket end, and a fourth sub-cable comprises the service end and a plug end; and
  c) a rechargeable battery that is further in electrical communication with a positive electrical lead and a negative electrical lead, wherein
    i) the positive electrical lead is further in electrical communication with the source end of the first or second jumper cable;
    ii) the negative electrical lead is further in electrical communication with the source end of the other of the first or second jumper cable;
    iii) the positive electrical lead of the rechargeable battery is further in electrical communication with at least one auxiliary electrically conducting cable; and
    iv) the negative electrical lead of the rechargeable battery is further in electrical communication with at least one auxiliary electrically conducting cable.

In further embodiments the invention provides a kit for jump starting vehicle batteries, wherein the kit comprises:
  a) a first jumper cable having the following structure:
    i) the cable comprises a source end, a service end, and a reversible coupling that when in a joined state is located at an intermediate position between the two ends;
    ii) the source end comprises a lead portion for forming a mechanical and electrical connection with a first electrical terminal of a voltage source;
    iii) the service end is in electrical communication with a locking, self-adjusting clamp;
    iv) the reversible coupling comprises a plug and a socket that when joined form a mechanically snug union; and
    v) when the reversible coupling is not joined, the cable is separated into two independent sub-cables, wherein a first sub-cable comprises the source end and a plug end, and a second sub-cable comprises the service end and a socket end;
  b) a second jumper cable having the following structure:
    i) the cable comprises a source end, a service end, and a reversible coupling that when in a joined state is located at an intermediate position between the two ends;

ii) the source end comprises a lead portion for forming a mechanical and electrical connection with a second electrical terminal of the voltage source;
iii) the service end is in electrical communication with a locking, self-adjusting clamp;
iv) the reversible coupling comprises a plug and a socket that when joined form a mechanically snug union; and
v) when the reversible coupling is not joined, the cable is separated into two independent sub-cables, wherein a third sub-cable comprises the source end and a socket end, and a fourth sub-cable comprises the service end and a plug end; and
c) a rechargeable battery that is further in electrical communication with a positive electrical lead and a negative electrical lead, wherein
i) the positive electrical lead is further in electrical communication with the source end of the first or second jumper cable;
ii) the negative electrical lead is further in electrical communication with the source end of the other of the first or second jumper cable;
iii) the positive electrical lead of the rechargeable battery is further in electrical communication with at least one auxiliary electrically conducting cable;
iv) the negative electrical lead of the rechargeable battery is further in electrical communication with at least one auxiliary electrically conducting cable; and
v) the rechargeable battery is encased within a portable protective housing that further comprises a handle.

DETAILED DESCRIPTION OF THE INVENTION

Figure 1:
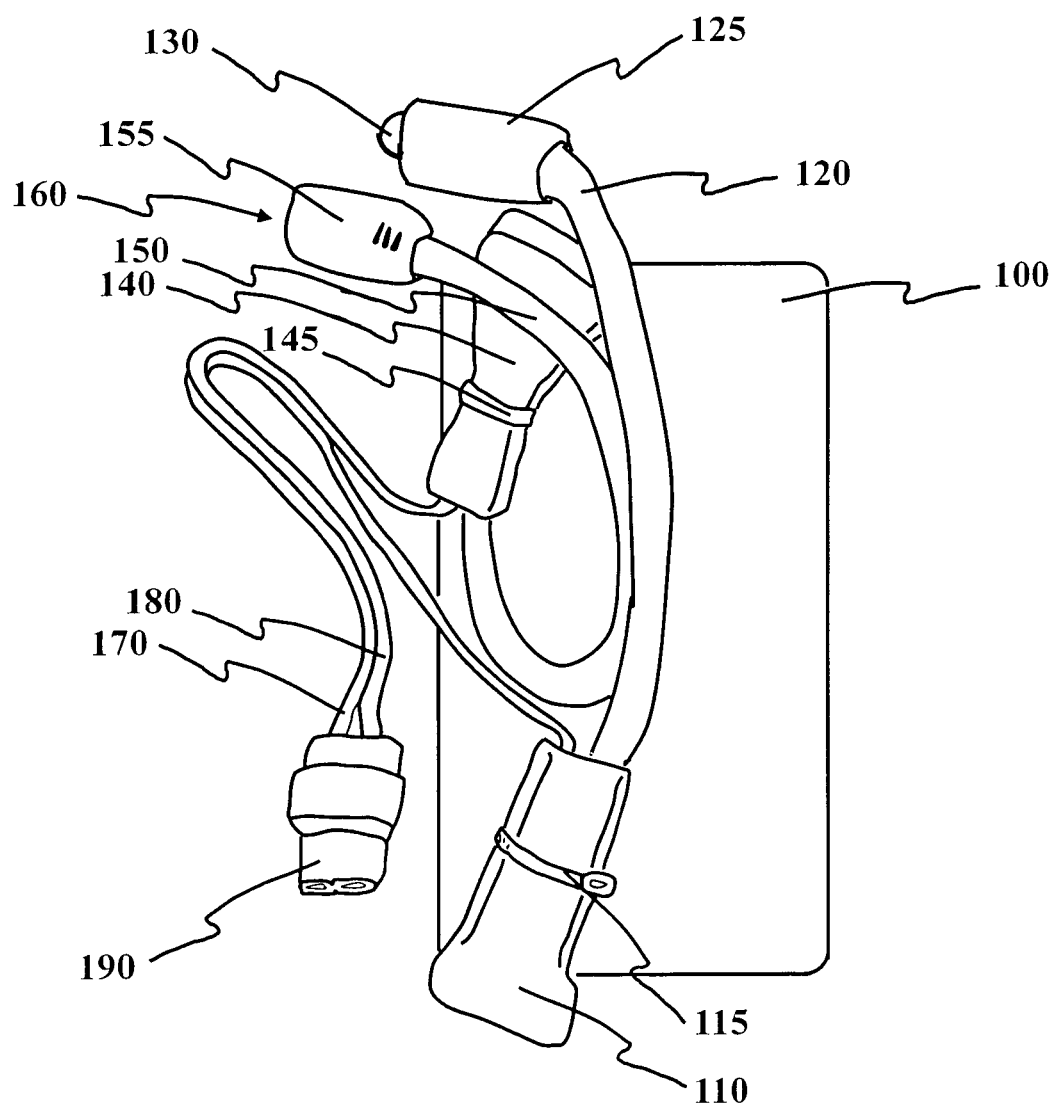
FIG. 1 is a caricature of a non-limiting illustrative embodiment of the invention in which a portable charging battery is connected to respective cables having electrical quick-change joints; and is also wired for recharging through a vehicle electrical system.

The present invention provides a system comprising paired jumper cables wherein the electrical connections for at least the vehicle battery to be charged are achieved by means of locking, self-adjusting clamps that are in electrical communication with the cables. In a particular embodiment the locking, self-adjusting clamps are Lock Jaw® automatic locking pliers but the invention is not so limited. In some embodiments just one end of each cable has such a clamp. In other embodiments each cable has such a clamp at both ends.

The cables further comprise at least one quick-change joint of a type suitable for spark-less operation. When making connections the clamps can be applied first and then the quick-change joint formed; when breaking connections the opposite sequence may be used; in each case sparks and arcing can be avoided. In one embodiment the quick-change joint is of a type used in arc welder cables, but the invention is not so limited. In some embodiments the positive cable has a quick-change joint; in some embodiments the negative cable has a quick-change joint; in some embodiments each cable has a quick-change joint; in further embodiments at least one of the cables optionally comprise more than one quick-change joint. In certain embodiments the joints are positioned at parallel sites at the end of fused paired cables to hinder accidental joining that would short-circuit a connected battery. In some embodiments the joints when joined define a shorter segment and a longer segment on each paired cable. In certain embodiments the shorter segments are designated for clamping to a charging battery and the longer segments are designated for clamping to a battery to be charged; in certain other embodiments the opposite is true.

In certain embodiments the pairing of the jumper cables is by use of two cables for which the respective insulated coatings are fused to each other along one side. In other embodiments the pairing of jumper cables comprises the use of two physically independent cables. In particular embodiments the paired cables are used to connect and charge a dead battery from one vehicle's engine directly from the live battery of another vehicle's engine. In further embodiments the paired cables are used to connect and charge a dead battery from one vehicle's engine directly from a live spare battery.

The system optionally comprises a portable charging battery. The charging battery if present may have a permanent electrical connection to a respective cable on each electrode post, wherein each connection is optionally protected by an insulating boot. In other embodiments the charging battery is free-standing and electrical connections are made to its electrode posts by means of self-adjusting locking clamps on the ends of jumper cables. In particular embodiments a respective wire runs from each electrode post of the portable charging battery to a single junction connector, whereby the connector may be plugged into an automotive electrical system to keep the charging battery at full charge capacity when not in use for recharging a vehicle battery. In some embodiments the charging battery is kept charged in a professional automotive service vehicle; in other embodiments the charging battery is kept charged in an end-user vehicle until needed to charge the primary battery.

The invention may be further understood by reference to the following definitions.

DEFINITIONS

The term "jump starting" refers to the practice of supplying power to a vehicle that has a discharged battery in order to restart the vehicle and hopefully return the dead battery to at least a minimal working level of charge. However the term does not necessarily mean that the dead battery is recharged to an extensive degree during the jump starting process.

The term "vehicle battery" refers to a battery such as is used to supply power to the spark plugs during ignition, to the vehicles exterior and interior lights, and to other electrical appliances of the car such as windshield wipers, heater, air conditioning, defroster, audio equipment, door locks, windows, and the like. Most traditional automotive vehicle batteries are 12-volt lead-acid batteries but the invention is not so limited.

The term "jumper cable" refers to an electrical cable, usually with clips at at least one end of each, that is used to connect electrical leads of between batteries or for grounding purposes between a battery and a vehicle metal frame. The term "structure" as used herein with respect to a jumper cable refers to the design of its construction.

The term "source end" means the end of a jumper cable that is connected to a live battery or other power source.

The term "service end" means the end of a jumper cable that is connected to a dead battery, vehicle metal frame, or other location for use in jump starting a vehicle.

The term "reversible coupling" refers to a connection between two cable portions that can be joined or separated at will. The term "joined state" with respect to such a coupling means that the parts of the coupling are mated to facilitate the flow of electrical current across the coupling and between the otherwise separated portions of the cable. The term "intermediate position" when describing the location of the coupling along the length of a cable when joined means that the coupling is between the two ends of the cable, as opposed to at either end.

The term "quick-change" as used herein refers to readily reversible couplings for use in joining and separating electrical cables.

The term "voltage source" means a power source that has an electrical potential. The term includes but is not limited rechargeable batteries, non-rechargeable batteries, capacitors, fuel cells, solar panels, electrical outlets in a building, electrical generators and alternators of any kind, and other voltage sources. These respective terms as used herein have their usual and ordinary meaning in the field.

The term "lead portion" as used with respect to a source end or service end means a mechanical feature at which an electrical connection can be made. The term "electrical terminal" used with respect to a voltage source or other object means a mechanical feature at which an electrical connection is made.

The term "mechanical connection" as used, e.g., with respect to joining two cables, means a docking of respective mechanical parts on the ends of the two cables, such as by twist-and-lock means, male and female mating, or another mechanical interlocking means.

The term "electrical connection" means a contact between two articles that permits electrical current to flow.

The term "in electrical communication" as used with respect to two or more articles means that an electrical current is able to flow between them.

The term "lock, self-adjusting clamp" means a clamp that, when applied to one or more features of one or more article(s), automatically adjusts the clamping dimensions to a dimension of the respective article feature(s) being clamped, while applying a clamping pressure with a pre-set force.

The term "plug" when used with respect to a reversible coupling refers to the portion (hereinafter "side") of the coupling that bears a prong, pin, or other male feature. The term plug includes but is not limited to plugs having one prong and plugs having a plurality of prongs. The term "prong" has its usual and ordinary meaning in mechanical description, e.g., household plugs typically have two or three prongs while plugs used for mating with sockets in arc-welding connections typically have one prong.

The term "socket" when used with respect to a reversible coupling refers to the portion (hereinafter "side") of the coupling that bears a receptacle or orifice to receive a prong, pine or other male feature. The term socket includes but is not limited to sockets that mate with a single prong and sockets that mate with a plurality of prongs. In the event that the designation of plug and socket is ambiguous, such as when one or both sides is hermaphroditic (i.e., having both a male feature and a receptacle or orifice for receiving a male feature), one side of the coupling is arbitrarily designated as the plug and the other side of the coupling is arbitrarily designated as the socket, and the designations are used consistently for all couplings of that type.

The term "of a type employed for arc welder cable connections" and comparable terms as used with respect to a plug or a socket, refers respectively to plugs and sockets for which the design and construction are consistent with those used for connecting cables such as are commonly used for arc welding purposes. In typical arc welding use these connect a cable to a power supply.

The term "mechanically snug union" as used with respect to a plug and socket refer to a mating of the pair that does not fall apart. A non-limiting illustrative example is a connection held together by a friction fit.

The term "independent sub-cable" as used herein means a cable portion that is capable of being joined with another cable portion by means of a reversible coupling between a plug end of one sub-cable and a socket end of the other sub-cable.

The term "plug end" refers to a cable end that is fitted with and in electrical connection with a plug.

The term "socket end" refers to a cable end that is fitted with and in electrical connection with a socket.

The terms "positive" and "negative" as used herein with respect to electrical leads and electrical polarity have their usual and ordinary meaning in the art.

The term "auxiliary electrically conducting cable" means a cable that is connected to an electrical lead of a voltage source for the purpose of recharging it, but that is not a jumper cable. The term "cable" as used herein is used without respect to the diameter or other attributes of a cable, so long as it is electrically conducting and capable of safely conducting the necessary amount of electrical current for its use according to the invention.

The term "grounding" refers to the common practice of providing an electrically conductive path to the earth or to a part of a vehicle other than its circuits and power sources.

The term "length" as used with respect to cables and sub-cables refers to their lengthwise dimension.

The terms "clamp", "pressure" and "set screw" have their usual and ordinary meanings in the mechanical arts regarding clamping and plier use.

The term "locked diameter range" as used herein with respect to locking pliers refers to the separation distance between the opposite contact points of their jaws when they are in a locked position around a work piece.

The term "work piece" means an object that is being held or manipulated by a mechanical tool.

The term "mechanically linked" as used herein with respect to two cables mean that they are physically held together in some fashion, such as by fusion of their electrically insulating cladding layers, one or more clips that holds them together, a filament that is tied one end to one of the cables and at the other end to the other cable, or other mechanical means for physically holding them.

The term "lead-acid battery" has its usual and ordinary meaning in the battery arts.

The term "fitted for a vehicle's wiring harness" as used with respect to an electrical connector refers to an electrical connector for obtaining power from a vehicle's electrical wiring system. Examples of such connectors include those used for hooking up tow trailers to the vehicle's electrical system, and connectors used for brake lights, tail lights, etc. Typically such connectors may readily be disconnected and reconnected merely by mating the parts.

The term "corresponding portion" as used with respect to a connector for a vehicles wiring harness refers to a connector counterpart for mating to form an electrical connection.

The terms "current" and "current flows" are synonymous and have the usual and ordinary meaning for electrical current in the electrical engineering arts.

The term "running" with respect to a vehicle means that the engine is in operation.

The term "kit" means a collection of components that can be combined physically to serve a particular purpose.

The term "rechargeable" as used with respect to a battery has its usual and ordinary meaning in the energy storage arts.

The term "encased" as used with respect to an object means that it is partly or wholly enveloped within an encasing material.

The term "protective housing" means an encasing material that surrounds an object.

The term "portable" refers to an object that may be carried by a person. The term "handle" has its usual and ordinary meaning for portable objects.

The term "fused" as used with respect a jumper cable and a battery lead end means that the jumper cable is connected to the lead in a substantially permanent way, i.e., that although they may or may not be welded together the connection is made suitable for permanent attachment throughout the life of the battery.

The term "together pass through" as used with respect to a plurality of cables and an orifice defined by a housing refers to the cables sharing the same housing portal when proceeding from a battery to the outside of housing or carrying case, as opposed to each cable exiting the housing through a separate respective orifice.

The term "display" means a visual display such as a dial or digital read-out. When described as being on the exterior of a housing, the term means the display is mounted on or in the housing and its display portion is visible and facing outward. The terms "voltmeter", "ohmmeter" and "ammeter" have their usual and ordinary meanings in the electrical arts.

DRAWINGS

The invention may be further understood by consideration of the drawings provided herein. Referring now to FIG. 1, it provides a caricature of top-down view of a non-limiting illustrative embodiment of the invention in which a portable charging battery is connected to respective cables having electrical quick-change joints; and is also wired for recharging through a vehicle electrical system. Element 100 is a battery such as is commonly used in the vehicle arts; a suitable non-limiting example is a 12-volt lead-acid battery. In the drawing the battery has an electrical terminal at either end of the top of the battery. A first terminal is in electrical communication with a short cable, 120, which terminates in a quick-change male part, 130, protected by an insulating sheath, 125. The first terminal is further in electrical communication with a recharging wire, 170. The first terminal is covered by an insulating boot 110, which may optionally be held around the cable and insulating wire by a tie piece, 115. The insulating boot at the first terminal and the insulating sheath at the quick-change end may optionally share a common color such as red or black to indicate the polarity of the first terminal, its cable and its recharging wire.

Still referring to FIG. 1, a second terminal is in electrical communication with a short cable, 150, which terminates in a quick-change male part, 160, protected by an insulating sheath, 155. The second terminal is further in electrical communication with a recharging wire, 180. The second terminal is covered by an insulating boot 140, which may optionally be held around the cable and insulating wire by a tie piece, 145. The insulating booth at the second terminal and the insulating sheath at the female quick-change end may optionally share a common color such as black or red—opposite to those of the first terminal and its cable—to indicate the polarity of the second terminal, its cable and its recharging wire.

Figure 2:
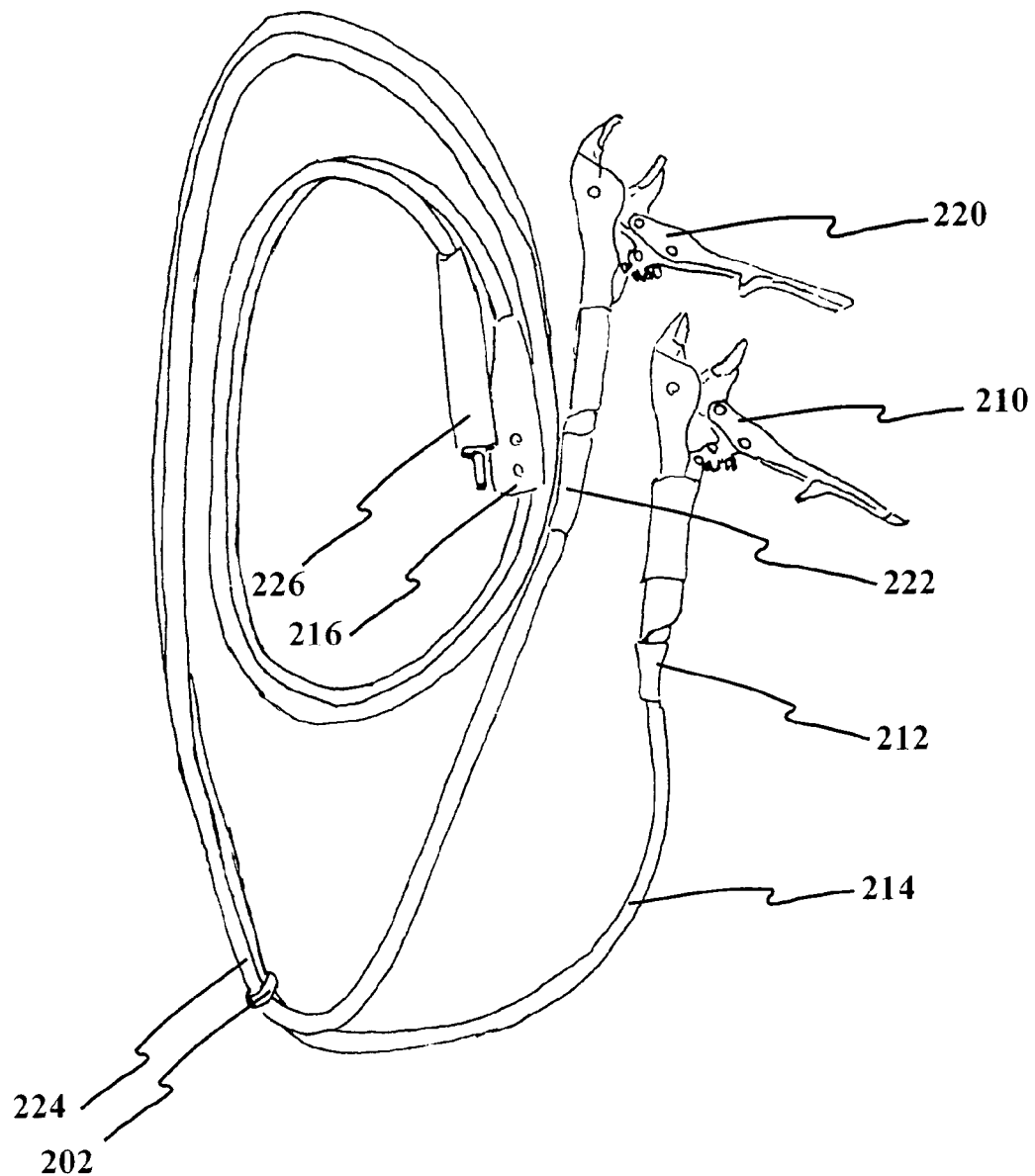
FIG. 2 is a caricature of a non-limiting illustrative embodiment of the invention in which: relatively short paired free-standing jumper cables each bear a locking, self-adjusting clamp on one end and a quick-change part on the other.

Turning now to FIG. 2, element 210 is a locking, self-adjusting clamp that has an electrical connection to a conducting cable, 214, where the connection is protected within an insulating sheath, 212. The opposite end of cable 214 has a female electrical quick-change element, 216. The series of elements 210, 212, 214 and 216 constitute a first independent sub-cable. A second independent sub-cable is comprised of elements 220, 222, 224 and 226, which are respectively: a locking, self-adjusting clamp, 220; an insulated connection, 222, between the clamp and a conducting cable, 224; and a male electrical quick-change element, 226. Element 202 is a clip for holding the two sub-cables in close proximity to each other. The male and female quick-change parts 226 and 216 may be mated with female and male parts 160 and 130 of FIG. 1, respectively, to connect to a portable battery, or alternatively may be mated with other sub-cables to form a complete jumper cable.

Figure 3:
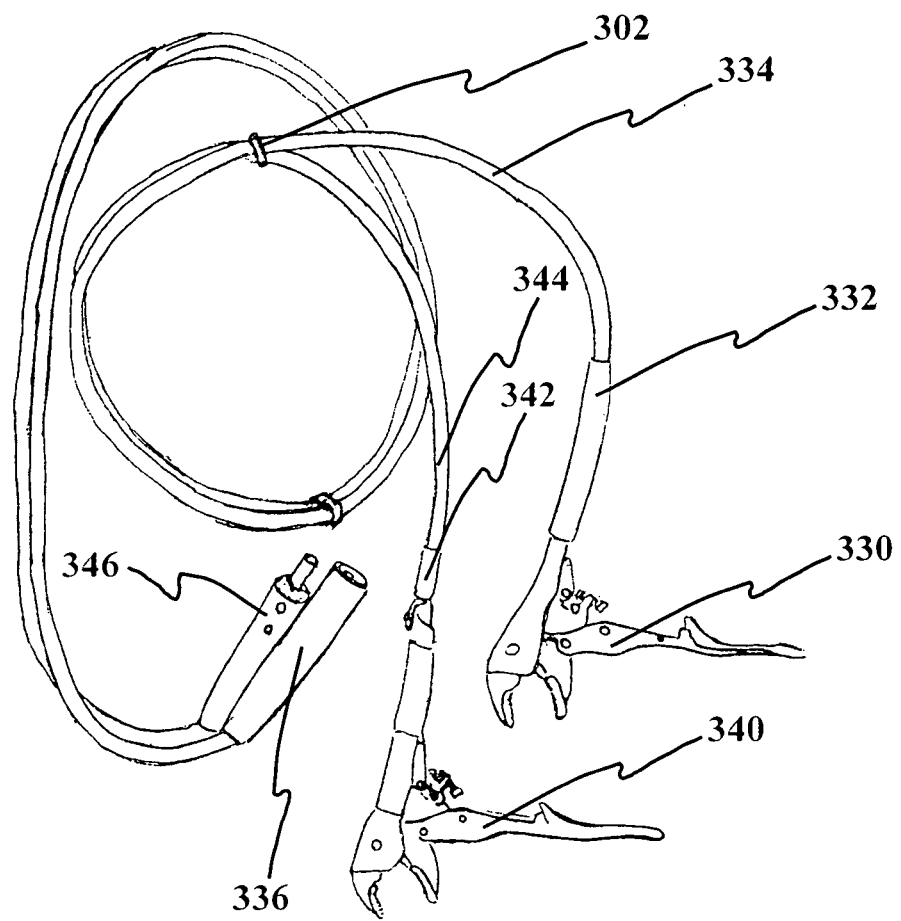
FIG. 3 is a caricature of a non-limiting illustrative embodiment of the invention in which: relatively short paired free-standing jumper cables each bear a locking, self-adjusting clamp on one end and a quick-change part on the other, and can be joined with cables of FIG. 2.

FIG. 3 illustrates further sub-cables for the latter use. A third independent sub-cable is comprised of elements that that are respectively: a locking, self-adjusting clamp, 330; an insulated connection, 332, between the clamp and a conducting cable, 334; and a 43male electrical quick-change element, 336. A fourth independent sub-cable is comprised of elements that that are respectively: a locking, self-adjusting clamp, 340; an insulated connection, 342, between the clamp and a conducting cable, 344; and a female electrical quick-change element, 346. The male and female quick-change parts 346 and 336 may be mated with female and male parts 216 and 226 of FIG. 1, respectively.

In some embodiments pairing of 346 with 216 may use a fitting design that is different from that of the pairing of 336 and 226, such as a different diameter for the fit or a different shape for the fit (e.g., square or hexagonal vs. circular). In certain embodiments cable 214 is significantly shorter than cable 224, and cable 344 is a corresponding amount shorter than cable 334. In some embodiments cable 224 is significantly shorter than cable 214, and cable 334 is a corresponding amount shorter than cable 344.

Voltage Source

In a particularly preferred embodiment the voltage source is a rechargeable battery having an electrical potential that matches that of a vehicle battery that is being recharged, such as a rating that is between 10 volts and 14 volts, or about 12 volts, or such as about 24 volts for a battery in a large tractor, however the invention is not so limited. In certain embodiments the voltage source is a power supply powered by non-rechargeable battery cells. In some embodiments the voltage source comprises a fuel cell. In certain embodiments the voltage source is the electrical outlet of a building or other structure, and the voltage is stepped down to that of the battery to be charged. In some embodiments the voltage source is a residential outlet, and the voltage is stepped down to that of the battery to be charged. In particular embodiments the voltage source is a generator such as a free-standing generator powered by gasoline, natural gas, a bicycle or geothermal energy. In other embodiments the voltage source is a solar panel. In particular embodiments the voltage source is a capacitor.

Booster batteries on the market are rated by peak amperage and cranking amperage, and sometimes list cold cranking amperage as well. Peak amperage ratings range from about 1,000 amps for automobile boosters up to almost 4,000 amps for heavy truck boosters. Cranking amperage ratings are substantially lower: typical ratings are in a range of between 200 and 600 amps. Cold cranking ratings are typically about a quarter to a third lower than the cranking amperage. The invention may be used with any type of booster battery and is not limited by their amperage ratings.

Auxiliary Cables

Where the voltage source is rechargeable, such as for a portable battery, it may be charged using the same cables by which dead batteries are charged by it. But optionally, the positive and negative terminals of the portable battery may be linked to auxiliary, i.e., separate wires or cables for use in its own recharging. These auxiliary wires or cables may be wired to a connector such as one that is fitted for a vehicle's wiring harness and used for connecting the wiring of a tow trailer to a vehicle's electrical system. At the designer's option there may be no auxiliary cables, one auxiliary cable, or a plurality of auxiliary cables. The integer number of auxiliary cables may be designated by a variable integer M for the positive electrical lead and a variable integer N for the negative electrical lead. In general N will equal M, though in the event that a separate grounding wire is used integer N will not necessarily equal integer M.

Service Cables

Service cables according to the invention are those by which a charged battery provides electrical current to a discharged battery, e.g., during a jump start. Cables whose core is comprised of pure copper are particularly preferred because of their high conductivity, but the invention is not so limited. In any event preferred cables have their conductive cores wrapped in insulation that is adequate for the temperatures that are reached when the wire core heats up as charging is underway. Cables of the type used for standard automotive jump starting are suitable. Cables of the type used for arc welding are also suitable, and in addition to being more flexible than standard automotive jumper cables also has a higher temperature rating for its insulation. These and other cables will tend to be suitable for the present invention if they satisfy the criteria discussed below.

In common use, standard jumper cables for automobiles have a gauge rating of six for their wiring. A gauge rating of ten can jump start lawn tractors, and a gauge rating of eight is sufficient for jump starting most automobiles. But for larger vehicles with larger batteries, a lower jumper cable gauge rating is often preferred or particularly beneficial, thus a gauge rating of six, four, two or even one is often preferred. The invention is not limited by the gauge value, because a plurality of thinner cables (e.g., 12 gauge) can substitute for thicker cables. Welding cable that has the desired gauge also performs well, though the invention is not so limited.

Service cables commonly also have amperage ratings. The invention is not limited by the amperage rating of the service cables. However, service cables and their clamps are commonly selected to have an amperage rating that is at least that of the cranking amperage of the booster battery. Otherwise the conducting wire may heat up resulting in destruction of its insulation and of the wire itself, possibly causing a fire.

Jumper cables in common use range in length from between about 6 feet to 25 feet or more; much longer cables are also in commercial use. The preferred length of the cable is a function of convenience in use on the road, but of course in selection has engineering relationships with the gauge of the cable with the cable's amperage rating, as is well known in the art. The present invention is not limited by the length of the service cables, however the following issues are noted. Regarding safety, if the cable is too short a booster battery may spark with the engine compartment of the vehicle for which a battery is being charged, in which case it may represent a fire hazard due to fuel fumes and oily deposits in that compartment. Regarding utility for cables having the same gauge, longer cables are less efficient at transferring direct current than are shorter cables. Generally the paired cables will be approximately equal in length but the invention is not so limited.

As convenient, cables for use in the present invention may be bound in pairs by: use of clips; fusion together along their lengths; a mutually shared sleeve; or by other means. Such pairing facilitates coiling, uncoiling, handling and monitoring. However the invention is not limited to cables that are physically constrained for pairing.

Sub-Cables and Reversible Coupling

Reversible couplings used in the invention provide a convenient separation point along the length of a cable. This facilitates spark avoidance because it allows live electrical connections to be broken at a safe distance from engine fumes and oily deposits. It also facilitates physical handling because the two parts of the cable are shorter when separated.

The invention contemplates the use of any coupling that capable of providing a snug reversible mating while allowing sufficient electrical current to flow. Examples of suitable coupling types for this purpose include arc-welding power supply couplings. For instance, paired HOBART® No. 4-No. 1 cable connectors, paired HOBART® No. 1-No. 3/0 cable connectors. So-called International-style DINSE® connectors (male-female matings) may be used, such as the small (ca. 5/16 inch, or 8.0 mm) diameter or the more common large (ca. 1/2 inch, or 13 mm) diameter; these twist and lock securely into place. Alternatively so-called American-style split pin connectors may be used that twist and lock into place; these are also known as TWECO®- or LENCO®-type connectors. Additional suitable fitting types include camlock fittings, VEAM® Powerlock fittings and the like, and others such as are known in the electrical arts.

Selected couplings preferably have an amperage rating that is at least near or exceeds the cranking amperage rating of the voltage source and of the amperage ratings for the service cables, whichever is lower. Typical small DINSE® connectors are rated for 150 amps; typical large DINSE® connectors are rated for 250 to 500 amps, depending on the design. VEAM® Powerlock connectors are available in 400 amp and 660 amp versions. And so forth.

Depending on the design, a reversible coupling in an embodiment of the invention may be located at any convenient place along the length of the cable on which it resides. In certain embodiments the coupling is located at approximately the mid-point of the cable, such that the cable has two sub-cables. In other embodiments the coupling is located at another point along the cable such that the component sub-cables differ significantly in length. In various embodiments paired jumper cables are approximately the same length and each have a coupling at their respective mid-points. In other embodiments paired jumper cables are approximately the same length and each has a coupling, but they differ in the location of the respective couplings along their respective cable lengths.

Power Terminal Clamps

The locking, self-adjusting clamp is a clamp that manually locks on to a work piece with a particular clamping pressure without regard to the diameter of the grasped part, so long as the diameter is within its range. In a non-limiting illustrative embodiment, the locking, self-adjusting clamp for use with the invention is a pair of pliers that is spring-loaded on one of the two handles, where the spring's spiral encircles a rail that allows a slip mechanism to proceed down the rail until a cam part located on the other handle engages a cam on the first handle's rail and locks down. Such pliers are described in U.S. Pat. Nos. 6,591,719 and 6,776,072. In a particular embodiment the pliers of the LOCKJAW® type, such as the CH Hanson 10100 10-inch curved jaw self-adjusting locking pliers. The only adjustment required there is to a small set screw for the cam on the first handle, and it sets the clamp pressure as opposed to the clamp diameter. The mechanism is similar to that of VISEGRIP® pliers, except that it locks the pressure and not the diameter. However, the LOCKJAW® may be set to lock the clamp in a diameter-specific way. In a preferred embodiment the handles of the clamp are coated partly or entirely with a rubber cladding layer to provide partial or full coverage with an electrically insulating layer.

The jaws of the clamp should have a profile that grips well on cylindrical, hexagonal and or other terminal designs. Alligator- or crocodile-type jaw profiles may be used, however parrot-type jaw profiles tend to hold better. Each of those designs is suited for side-on grips on a battery terminal, however other grips may be used. For instance, the clamp may be used with a moderately pliable conducting thimble that fits over a battery pole, where the clamp is then applied to grip the length of the thimble, i.e., in an end-on fashion. In some embodiments the clamp is applied end-on without a thimble.

In some embodiments the pressure applied by the clamp is selected from a range that is: between 1 and 100 pounds per square inch (psi); between 2 and 80 psi, between 3 and 60 psi; between 4 and 40 psi; or between 5 and 30 psi. In various embodiments the clamp diameter is selected from a range that is: up to four inches; up to two inches; and at least one inch.

Clamps on commercial jumper cables are commonly rated for between about 150 and 800 amperes; the usual range for clamps on heavy duty jumper cables for automobiles is about 400 to 500 amps. In several cases commercial clamps are comprised of copper to improve their electrical conductivity. For the present invention ordinary LOCKJAW® clamps have been found to be more than adequate to accommodate the necessary current for jump starting vehicles under a large variety of conditions and for a large variety of vehicle categories.

For purposes of the present invention a clamp may be affixed to the conducting core wire(s) of a jumper cable by welding the two together, or by a mechanical means such as the use of a bolt and nut to bind the clamp handle to an electrical lead (e.g., a lug) on the end of a jumper cable, or may be affixed by any other means that binds the clamp and conducting core wire(s) together without preventing an adequate flow of electrical current between them under use conditions.

The embodiments of the invention as described herein are merely illustrative and are not exclusive. Numerous additions, variations, derivations, permutations, equivalents, combinations and modifications of the above-described invention will be apparent to persons of ordinary skill in the relevant arts and are within the scope and spirit of the invention. The invention as described herein contemplates the use of those alternative embodiments without limitation.

The invention claimed is:

1. A system for jump starting vehicle batteries, wherein the system comprises:
   a) a first jumper cable having the following structure:
      i) the cable comprises a source end, a service end, and a reversible coupling that when in a joined state is located at an intermediate position between the two ends;
      ii) the source end comprises a lead portion for forming a mechanical and electrical connection with a first electrical terminal of a voltage source;
      iii) the service end is in electrical communication with a locking, self-adjusting clamp;
      iv) the reversible coupling comprises a plug and a socket that when joined form a mechanically snug union; and
      v) when the reversible coupling is not joined, the cable is separated into two independent sub-cables, wherein a first sub-cable comprises the source end and a plug end, and a second sub-cable comprises the service end and a socket end;
   b) a second jumper cable having the following structure:
      i) the cable comprises a source end, a service end, and a reversible coupling that when in a joined state is located at an intermediate position between the two ends;
      ii) the source end comprises a lead portion for forming a mechanical and electrical connection with a second electrical terminal of the voltage source;
      iii) the service end is in electrical communication with a locking, self-adjusting clamp;
      iv) the reversible coupling comprises a plug and a socket that when joined form a mechanically snug union; and
      v) when the reversible coupling is not joined, the cable is separated into two independent sub-cables, wherein a third sub-cable comprises the source end and a socket end, and a fourth sub-cable comprises the service end and a plug end;
   c) a voltage source that is in electrical communication with a positive electrical lead and a negative electrical lead, wherein
      i) the positive electrical lead is further in electrical communication with the source end of the first or second jumper cable;
      ii) the negative electrical lead is in electrical communication with the source end of the other of the first or second jumper cable;
      iii) the positive electrical lead of the voltage source is further in electrical communication with a number M of auxiliary electrically conducting cables, wherein M is an integer that has a value selected from the group consisting of 0 and at least 1; and
      iv) the negative electrical lead of the voltage source is further in electrical communication with a number N of auxiliary electrically conducting cables, wherein N is an integer and has a value that is equal to the value of M.

2. The system of claim 1, wherein the voltage source is further in electrical communication with an electrical lead for grounding the battery.

3. The system of claim 1, wherein the first sub-cable and the third sub-cable have different lengths.

4. The system of claim 3, wherein the first cable and the second cable are of equal length.

5. The system of claim 1, wherein the voltage source is selected from the group consisting of batteries, capacitors, solar panels, generators, and electrical outlets of buildings.

6. The system of claim 1, wherein each plug comprises a single prong.

7. The system of claim 1, wherein each cable's plug and socket is of a type employed for arc welder cable connections.

8. The system of claim 1, wherein the respective plugs of the first and second cable each have a single prong, and wherein the plug of the first cable and the plug of the second cable differ in the diameter and/or shape of the prong on their respective plugs.

9. The system of claim 1, wherein the locking self-adjusting clamp is configured by a set-screw to a clamp pressure selected from the range of between 1 pound and 100 pounds per square inch.

10. The system of claim 9, wherein the clamp pressure is selected from the range of between 5 pounds and 30 pounds per square inch.

11. The system of claim 1, wherein the locking self-adjusting clamp has a locked diameter range of up to four inches.

12. The system of claim 11, wherein the locking self-adjusting clamp has a locked diameter range of up to two inches.

13. The system of claim 11, wherein the locking self-adjusting clamp has a locked diameter range of up to at least one inch.

14. The system of claim 1, wherein the first and second cables are mechanically linked to one another.

15. A system for jump starting vehicle batteries, wherein the system comprises:
   a) a first jumper cable having the following structure:
      i) the cable comprises a source end, a service end, and a reversible coupling that when in a joined state is located at an intermediate position between the two ends;
      ii) the source end comprises a lead portion for forming a mechanical and electrical connection with a first electrical terminal of a voltage source;
      iii) the service end is in electrical communication with a locking, self-adjusting clamp;
      iv) the reversible coupling comprises a plug and a socket that when joined form a mechanically snug union; and
      v) when the reversible coupling is not joined, the cable is separated into two independent sub-cables, wherein a first sub-cable comprises the source end and a plug end, and a second sub-cable comprises the service end and a socket end;
   b) a second jumper cable having the following structure:
      i) the cable comprises a source end, a service end, and a reversible coupling that when in a joined state is located at an intermediate position between the two ends;
      ii) the source end comprises a lead portion for forming a mechanical and electrical connection with a second electrical terminal of the voltage source;
      iii) the service end is in electrical communication with a locking, self-adjusting clamp;
      iv) the reversible coupling comprises a plug and a socket that when joined form a mechanically snug union; and
      v) when the reversible coupling is not joined, the cable is separated into two independent sub-cables, wherein a third sub-cable comprises the source end and a socket end, and a fourth sub-cable comprises the service end and a plug end; and
   c) a rechargeable battery that is further in electrical communication with a positive electrical lead and a negative electrical lead, wherein
      i) the positive electrical lead is further in electrical communication with the source end of the first or second jumper cable;
      ii) the negative electrical lead is further in electrical communication with the source end of the other of the first or second jumper cable;
      iii) the positive electrical lead of the rechargeable battery is further in electrical communication with at least one auxiliary electrically conducting cable; and
      iv) the negative electrical lead of the rechargeable battery is further in electrical communication with at least one auxiliary electrically conducting cable.

16. The system of claim 15, wherein the rechargeable battery is a 12-volt lead-acid battery.

17. The system of claim 15, wherein:
   a) the rechargeable battery's positive electrical lead is further in electrical communication with an auxiliary electrically conducting cable that is further in electrical communication with a first electrical connector that is fitted for a vehicle's wiring harness; and
   b) the rechargeable battery's negative electrical lead is further in electrical communication with an auxiliary electrically conducting cable that is further in electrical communication with a second electrical connector that is fitted for the vehicle's wiring harness; wherein
   c) when the two connectors are connected to corresponding portions of the vehicle's wiring harness, current flows to the rechargeable battery when the vehicle is running.

18. A kit for jump starting vehicle batteries, wherein the kit comprises:
   a) a first jumper cable having the following structure:
      i) the cable comprises a source end, a service end, and a reversible coupling that when in a joined state is located at an intermediate position between the two ends;
      ii) the source end comprises a lead portion for forming a mechanical and electrical connection with a first electrical terminal of a voltage source;
      iii) the service end is in electrical communication with a locking, self-adjusting clamp;
      iv) the reversible coupling comprises a plug and a socket that when joined form a mechanically snug union; and
      v) when the reversible coupling is not joined, the cable is separated into two independent sub-cables, wherein a first sub-cable comprises the source end and a plug end, and a second sub-cable comprises the service end and a socket end;
   b) a second jumper cable having the following structure:
      i) the cable comprises a source end, a service end, and a reversible coupling that when in a joined state is located at an intermediate position between the two ends;
      ii) the source end comprises a lead portion for forming a mechanical and electrical connection with a second electrical terminal of the voltage source;
      iii) the service end is in electrical communication with a locking, self-adjusting clamp;
      iv) the reversible coupling comprises a plug and a socket that when joined form a mechanically snug union; and
      v) when the reversible coupling is not joined, the cable is separated into two independent sub-cables, wherein a third sub-cable comprises the source end and a socket end, and a fourth sub-cable comprises the service end and a plug end;
   c) a rechargeable battery that is further in electrical communication with a positive electrical lead and a negative electrical lead, wherein
      i) the positive electrical lead is further in electrical communication with the source end of the first or second jumper cable;
      ii) the negative electrical lead is further in electrical communication with the source end of the other of the first or second jumper cable;
      iii) the positive electrical lead of the rechargeable battery is further in electrical communication with at least one auxiliary electrically conducting cable;

iv) the negative electrical lead of the rechargeable battery is further in electrical communication with at least one auxiliary electrically conducting cable; and v) the rechargeable battery is encased within a portable protective housing that further comprises a handle.

19. The system of claim 18, wherein the positive and negative electrical leads of the rechargeable battery are fused to the source end of the respective jumper cables, and: the first and third sub-cables together pass through a single orifice defined by the protective housing, or separately pass through respective orifices defined by the protective housing.

20. The system of claim 18, wherein the kit further comprises at least one display located on the exterior of the housing, wherein the display provides information from at least one of a voltmeter, an ohmmeter and an ammeter.

* * * * *